Patented Aug. 10, 1937

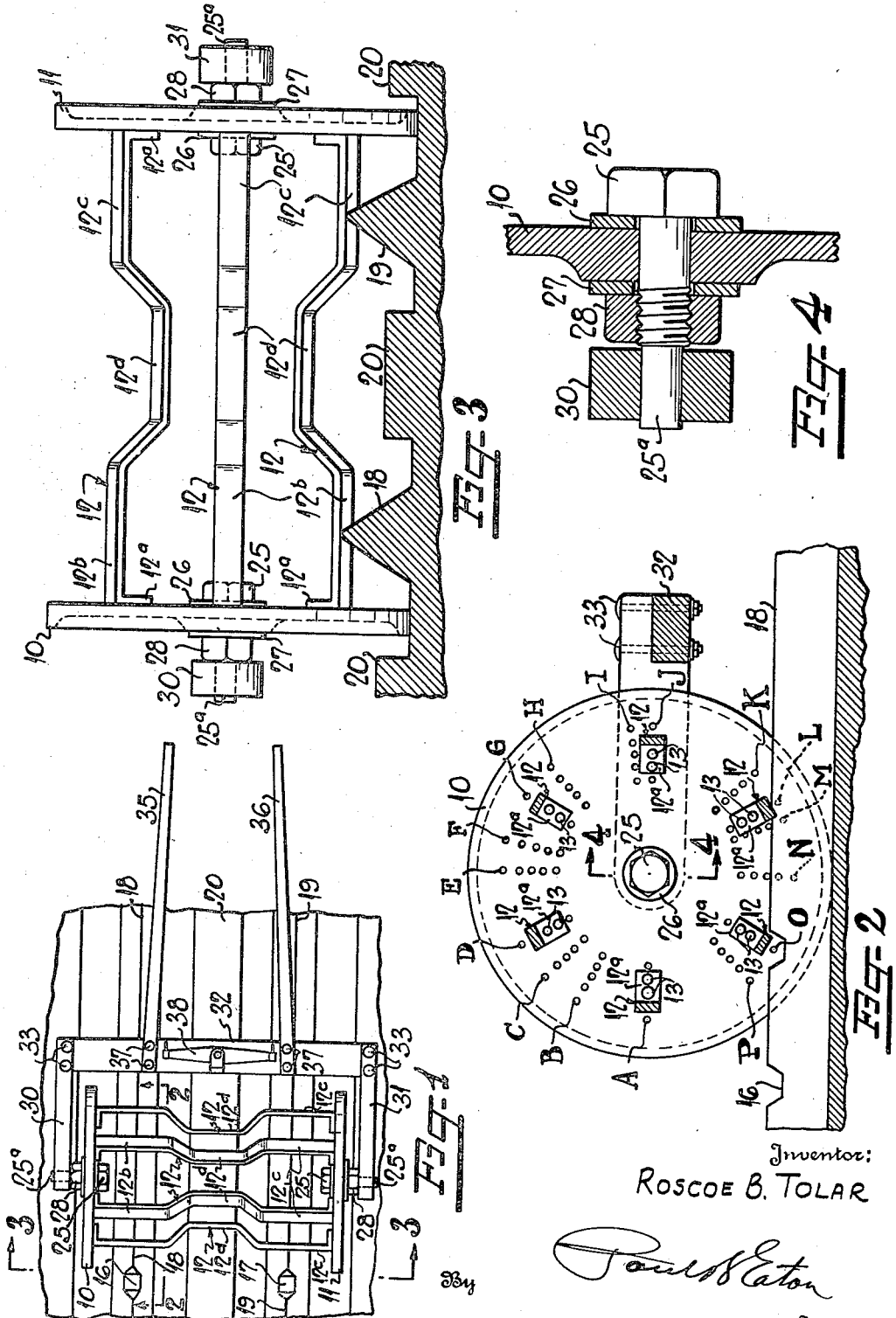

2,089,451

UNITED STATES PATENT OFFICE 2,089,451

ROW MARKER

Roscoe B. Tolar, Saint Pauls, N. C.

Application July 13, 1936, Serial No. 90,315

5 Claims. (Cl. 97—229)

This invention relates to a marking device, and more especially to a device used for providing uniformly spaced marks in prepared soil to serve as a spacing guide when vegetation is transplanted therein.

It is, therefore, an object of this invention to provide a marking device of the class described for simultaneously making indentations on two or more lists of prepared soil so that the vegetation which is transplanted may be uniformly spaced according to said indentations. Means are also provided whereby the distance between the indentations may be varied to regulate the distance between the plants.

Some of the objects of the invention having been stated, other objects will appear as the description proceeds, when taken in connection with the accompanying drawing, in which:—

Figure 1 is a plan view of the invention, shown in operation on prepared soil;

Figure 2 is a sectional view taken along line 2—2 in Figure 1;

Figure 3 is a rear elevation of the invention, showing the soil in section, and taken along line 3—3 in Figure 1;

Figure 4 is a sectional detail view taken along line 4—4 in Figure 2.

Referring more specifically to the drawing, the numerals 10 and 11 denote suitable disks which have their proximate faces connected by means of a plurality of U-shaped members 12. The members 12 are secured to the disks 10 and 11 by providing suitable bolts 13 which penetrate the parallel, radially disposed legs 12a of members 12 and also a selected group of radially disposed holes such as designated by the letters A, B, C, D, E, F, G, H, I, J, K, L, M, N, O and P, which are punched in each of the disks 10 and 11 in an identical manner.

Each of the U-shaped members 12 has horizontally disposed portions 12b and 12c which act as marking surfaces for plowing indentations such as 16 and 17 on lists or ridges 18 and 19 respectively, in the prepared soil as the device is pulled longitudinally of the ridges. There is also a horizontal portion 12a disposed between portions 12b and 12c. It will be noted that the portion 12d travels about a shorter radius with respect to the centers of disks 10 and 11 and consequently, will not, ordinarily, contact any portion of intermediate portions 20 of soil which are disposed between ridges 18 and 19.

The center of each of the disks 10 and 11 has a hole therethrough which is penetrated by a suitable bolt 25. Washers 26 and 27 are also disposed on said bolt and positioned on opposed sides of the disk and in order to securely hold the parts in position a nut 28 is threadably secured on the bolt. The bolt 25 has a smooth restricted portion 25a which projects outwardly beyond the nut 28, which portion rotates in a suitable bearing in strut 30.

The arrangement by which disk 11 is connected to its strut 31 is identical in all respects and like reference characters will be given like parts.

The forward end of struts 30 and 31 are connected by transverse draw bar 32 by means of suitable bolts 33. Connected to the draw bar are shafts 35 and 36 by means of bolt 37. There is also connected to the draw bar 32 a singletree 38. A beast of burden is adapted to operate between the shafts and exert a traction upon the singletree to guide and pull the implement longitudinally of ridges 18 and 19 so that uniformly spaced indentations 16 and 17 will be made on top of the ridges by portions 12b and 12c to serve as a guide for transplanting vegetation or plants thereon.

In the present showing, there are six U-shaped members 12 equally spaced with their horizontal portions 12b and 12c equidistant from the center of disks 10 and 11. Since the radially disposed holes in each group A to P inclusive, are equally spaced, it is possible for the legs 12a to be positioned so that the pair of holes in these legs will match with any pair of adjacent holes in the disks; consequently, the members 12 may be adjusted radially, inwardly or outwardly, relative to the disks so that the portions 12b and 12c will be properly positioned to accommodate a high or low ridge as it is preferable to let the disks 10 and 11 contact the ground adjacent one side of a ridge.

If it is desired to vary the distance between the indentations, the position of members 12 must be changed and the number of these members increased or decreased. For example, let us assume that the portions 12b and 12c are located on a circle 120 inches in circumference. If it is desired that the indentations be thirty inches apart it would be necessary to have four members 12 equally spaced and connected to disks at the groups of holes A, E, J and N; if a spacing of twenty four inches is desired the groups B, F, I, M and P are used; if a spacing of twenty inches is desired, the groups A, D, G, J, L, and C are used; if a spacing of fifteen inches is desired, the groups, A, C, E, H, J, K, N and P are used.

It is, therefore, seen that means have been provided whereby the position of the marking members may be varied to accommodate different heights of ridges and also that the distance between the indentations can be varied by changing the number of members 12 and re-arranging them so that they will be properly spaced relative to each other.

In the drawing and specification there has been set forth a preferred embodiment of the invention, and although specific terms are employed, they are used in a generic and descriptive sense only, and not for purposes of limitation, the scope of the invention being set forth in the appended claims.

I claim:

1. Apparatus for forming indentations in rows in the form of ridges to indicate where plants are to be transplanted comprising a rolling member adapted to roll longitudinally over the ridges, and having radially disposed marking members at each end thereof provided with a horizontal member disposed between said radially disposed members for engaging the rows to form indentations therein at spaced intervals, said members having the central portion thereof bent inwardly towards the longitudinal axis of said members so that only the end portions of said radially disposed members will contact the ground.

2. Apparatus for marking two parallel ridges in a field to indicate where plants are to be set, comprising a framework, means whereby the framework may be moved along the ridges, a member mounted in said framework for rolling movement as the framework is moved along the ridges, said rolling member having a pair of spaced disks provided with a plurality of sets of transversely disposed holes, spaced means projecting radially from the same and adapted to engage the ridges and form indentations therein, means for securing the said spaced means in selected sets of said holes to thereby regulate the effective distance between the indentations formed in the ridges.

3. Apparatus for marking rows to indicate where a planting operation should be performed and comprising a framework, a pair of spaced disks rotatably mounted at their centers in said framework, spaced means disposed between the disks for engaging the ridges as the disks roll alongside the ridges for forming indentations in the ridges to designate the location of a plant, means for adjusting said spaced means radially and circumferentially of the roller to thereby regulate the distance between the indentations made in rows by said spaced means, each of said spaced means having the central portion thereof bent inwardly towards the center of rotation of said disks to prevent the center portion of said spaced members from contacting the ground.

4. Apparatus for marking two parallel ridges in a field to indicate where plants are to be set, comprising a framework, means whereby the framework may be moved along the ridges, a member mounted in said framework for rolling movement as the framework is moved along the ridges, said rolling member having a pair of spaced disks, spaced means secured to the proximate sides of the disks and spanning the distance therebetween and adapted to engage the ridges and form indentations therein, said disks having a plurality of sets of radially alined holes penetrating the same transversely whereby the spaced means may be adjusted in position circumferentially and radially of the rolling member to thereby regulate the effective distance between the indentations formed in the ridges.

5. Apparatus for forming indentations in spaced parallel ridges which have been previously formed in soil to thereby indicate the position where plants are to be transplanted in a subsequent and independent operation, comprising a framework, a pair of spaced disks mounted for rotation in said framework, each of said disks having a plurality of sets of radially alined and transversely disposed holes therein, a plurality of bars having means penetrating a selected set of said holes to secure the bars to the disks, means for securing a draft animal to said apparatus whereby when the apparatus is rolled longitudinally of the ridges said bars will form indentations in said ridges to indicate the spot where plants should be located.

ROSCOE B. TOLAR.